(12) United States Patent
Drubel et al.

(10) Patent No.: US 7,245,031 B2
(45) Date of Patent: Jul. 17, 2007

(54) GENERATOR WITH INTEGRATED POWERSWITCH

(75) Inventors: Oliver Drubel, Nussbaumen (DE); Reinhard Joho, Rombach (CH); Jean-Jacques Simond, Morges (CH); Alfred Rufer, Villars-sous-Yens (CH)

(73) Assignee: Alstom Technology Ltd., Baden (CH)

( * ) Notice: Subject to any disclaimer, the term of this patent is extended or adjusted under 35 U.S.C. 154(b) by 188 days.

(21) Appl. No.: 11/092,102

(22) Filed: Mar. 29, 2005

(65) Prior Publication Data
US 2006/0181818 A1 Aug. 17, 2006

(30) Foreign Application Priority Data
Mar. 31, 2004 (DE) .............. 10 2004 016 456

(51) Int. Cl.
H02H 7/06 (2006.01)
H02K 7/18 (2006.01)
(52) U.S. Cl. ................... 290/1 B; 310/254
(58) Field of Classification Search ........... 310/66, 310/67 R, 254; 290/1 R, 1 A, 1 B, 52, 55
See application file for complete search history.

(56) References Cited

U.S. PATENT DOCUMENTS 6,380,648 B1 * 4/2002 Hsu ................ 310/67 A
6,495,929 B2 * 12/2002 Bosley et al. ............ 290/52
6,737,786 B2 * 5/2004 Hsu ........................ 310/254
7,061,133 B1 * 6/2006 Leijon et al. ............. 290/44

FOREIGN PATENT DOCUMENTS

| DE | 8624626 | 5/1993 |
|---|---|---|
| DE | 20004437 | 7/2000 |
| DE | 10100159 | 10/2001 |
| EP | 1401089 | 3/2004 |

OTHER PUBLICATIONS

L. Zehnder et al., "SF$_6$ generator circuit-breaker system for short-circuit currents up to 200 kA", ABB-Review Mar. 2002, ABB Switzerland Ltd, pp. 34-40.
M. Leijon, "Powerformer ™—a radically new rotating machine", ABB-Review Feb. 1998, ABB Switzerland Ltd, pp. 21-26.

* cited by examiner

*Primary Examiner*—Bentsu Ro
(74) *Attorney, Agent, or Firm*—Darby & Darby

(57) ABSTRACT

A generator having electronic circuit breakers as circuit breakers, whereby circuits comprising thyristors, IGBT elements and/or GTO thyristors are used, and whereby the circuit breakers are integrated into the generator, preferably in that the circuit breakers are distributed on parallel winding branches of the stator. Such power electronics can also be used for switching generators having a power above 50 MV with very short switching times of a few milliseconds.

18 Claims, 3 Drawing Sheets

GENERATOR WITH INTEGRATED POWERSWITCH

This application claims priority to German Patent Application Serial No. DE 10 2004 016 456.8, filed Mar. 31, 2004, the entire disclosure of which is hereby incorporated by reference herein.

The present invention relates to the field of circuit breakers for generators with which even high-power generators in the range from tens of MW to 2000 MW can be connected to the electrical network.

BACKGROUND

Circuit breakers are devices that serve to connect and disconnect current-carrying phase conductors in a three-phase network as needed. Whenever a sensor detects an error in the network, which typically manifests itself in the form of a voltage drop or a corresponding change in the current, such a circuit breaker opens one or more of the three phases, thus preventing the further flow of current. Such a circuit breaker can also be used as a reclosing switch in order to once again connect the current-carrying contacts.

Typically, such circuit breakers are configured as mechanical switches. The dimensioning is essentially determined by the maximum breaking capacity, which can amount to several thousand MVA. The switch uses the periodically occurring current zero crossings for switching off. Nevertheless, so-called electric arcs occur when the contacts are disconnected. In order to be able to dissipate these discharges in a controlled manner, the actual mechanical contacts are normally arranged in an arc quenching chamber, which is filled with an inert, electrically insulating gas such as, for example, $SF_6$. Such a structure is described, for instance, in the ABB Review March 2002, pages 34 to 40.

Although mechanical circuit breakers for generators are capable of handling the power that is present in high-voltage networks, even with repeated closing and opening procedures of the circuit, they do have drawbacks, on the one hand, fundamentally because of their mechanical nature (wear) and, on the other hand, because of the fact that conventional circuit breakers require switching times (actuating signal until the voltage returns) of 60 to 120 ms. Accordingly, unavoidably high generator currents occur before the switch can effectuate the interruption.

SUMMARY OF THE INVENTION

An object of the present invention is to create a structurally simple, rapidly switching generator with at least one circuit breaker for connecting and/or disconnecting phases of the generator from a network.

The present invention provides a generator with at least one circuit breaker configured as an electronic circuit breaker, this circuit breaker being integrated into the generator. In order to optimally integrate such an electronic circuit breaker into the generator, it has proven to be advantageous to distribute the circuit breakers on parallel winding branches of the stator.

Hence, the present invention uses power electronics instead of a mechanical switch for switching purposes, even in high-power generators. Semiconductors with inherently shorter switching times make a major contribution to insulating the generator from network malfunctions as early as possible, which has an advantageous effect on the dimensioning of the generator and of the turbine.

The maximum switch-off times lie in the order of magnitude of 10 ms (one period) and, by using disconnectable semiconductors or known commutation circuits, can be pushed into the range of one ms. The latter also applies to the switching off of currents with absent zero crossings. The power electronic arrangement is maintenance-free. Therefore, it can be advantageously integrated into the generator.

The use of maintenance-free power electronics, as preferred, allows a simple integration of the circuitry into the generator. This is done in an especially efficient manner in that the circuit breakers are distributed on parallel winding branches of the stator. Preferably, the approach taken here is such that—in the case of a generator with a stator and with at least two parallel circuits per generator phase, whereby the parallel circuits are each connected to the same generator phase—each of the parallel circuits can be switched via at least one of the above-mentioned circuit breakers. Due to the distribution over different parallel circuits, the power that occurs during the switching procedure and during operation can be distributed over several circuit breakers, and moreover, the switching procedure can be readily integrated into the generator. The use of power electronics is simplified in this manner. It has been found that such circuitry can be used with the implementation of power electronics even for a generator with a power of more than 5 MW, or even with a power in the range above 50 MW up to especially 2000 MW. The inherently present winding inductivity of the individual parallel circuits automatically ensures a uniform distribution of the current among the circuit breakers that function in parallel.

According to a first preferred embodiment of the invention, the circuit breaker comprises at least two thyristors connected anti-parallel. These two thyristors connected anti-parallel are opened or closed essentially simultaneously during the switching procedure. Thyristors are preferred because of their high tolerance for high currents. Here, it is possible to connect several thyristors in series. In order to minimize the installation size and the losses in the thyristors, thyristors based on SiC technology can be used.

In another preferred embodiment the circuit breaker has at least two oppositely (that is to say, with opposite polarity) series-connected IGBT elements (insulated gate bipolar transistor) and/or GTO elements (gate turn-off thyristor). In order to take up the negative voltages that are harmful for these elements, they are each provided with diodes connected anti-parallel thereto. Typically, IGBT or GTO elements are already equipped with such integrated diodes.

In order to further support the network in case of malfunction, it can prove to be advantageous to provide means that prevent a complete disconnection from the network (residual current). This can be done in that, parallel to the circuit breaker, there is at least one current-limiting impedor (RL element, e.g. air inductor with solid aluminum windings). A second, series-connected circuit breaker then takes over the complete disconnection from the network.

Particularly with the use of IGBT or GTO elements with which, in contrast to the simple thyristors, the switching procedure is not executed at the current zero crossing, high switch-off energies that have to be dissipated occur during the switching procedure. With a mechanical switch, this occurs in the form of an electric arc and, in the case of instantaneously disconnectable power electronics, it is necessary to likewise take up the energy during the switching procedure in a controlled manner. Accordingly, another preferred embodiment is characterized in that circuitry for power take-up is provided in case of a switching off procedure. This is preferably at least one non-linear resistor— arranged parallel to the circuit breaker—as an overvoltage protector which, above a maximum voltage, in the ideal case, allows the current to go towards infinity, and which does not allow any current to pass through below this maximum voltage. In the passage area, the taken-up energy is dissipated as heat.

According to another preferred embodiment of the present invention, the circuit breaker used in the generator has the following structure: the circuit has a switching element in the form of a thyristor, of an IGBT element or of a GTO element, especially in the form of SiC elements, whereby a branching of the phase configuration is provided. Here, each arm of the branching has two diodes arranged oppositely in series, whereby the diodes are arranged in each arm with a different orientation. The switching element is now arranged perpendicularly in the branching, in each case between the diodes provided in one arm so as to be connected to the arm in question. In this manner, the component costs can be further reduced.

Furthermore, the present invention relates to the use of an electronic circuit breaker in a generator for connecting and disconnecting phases of the generator from a network. Here, the circuit breaker is integrated into the generator and preferably the circuit breakers are distributed over parallel winding branches of the stator.

Moreover, the present invention relates to a method for operating at least one group of such circuit breakers, especially in a generator of the above-mentioned type. In particular, the method is characterized in that, as soon as the network current exceeds a threshold value and/or the network voltage falls below a threshold value, a group of circuit breakers is opened essentially simultaneously. By the same token, the switching-on procedure can be automated in that the group of circuit breakers is closed again automatically, optionally after a predefined delay, whenever the network voltage exceeds the threshold value.

BRIEF DESCRIPTION OF THE DRAWINGS

The invention will be explained below with reference to examples of embodiments in conjunction with the drawings, in which.

DETAILED DESCRIPTION

Figure 1:
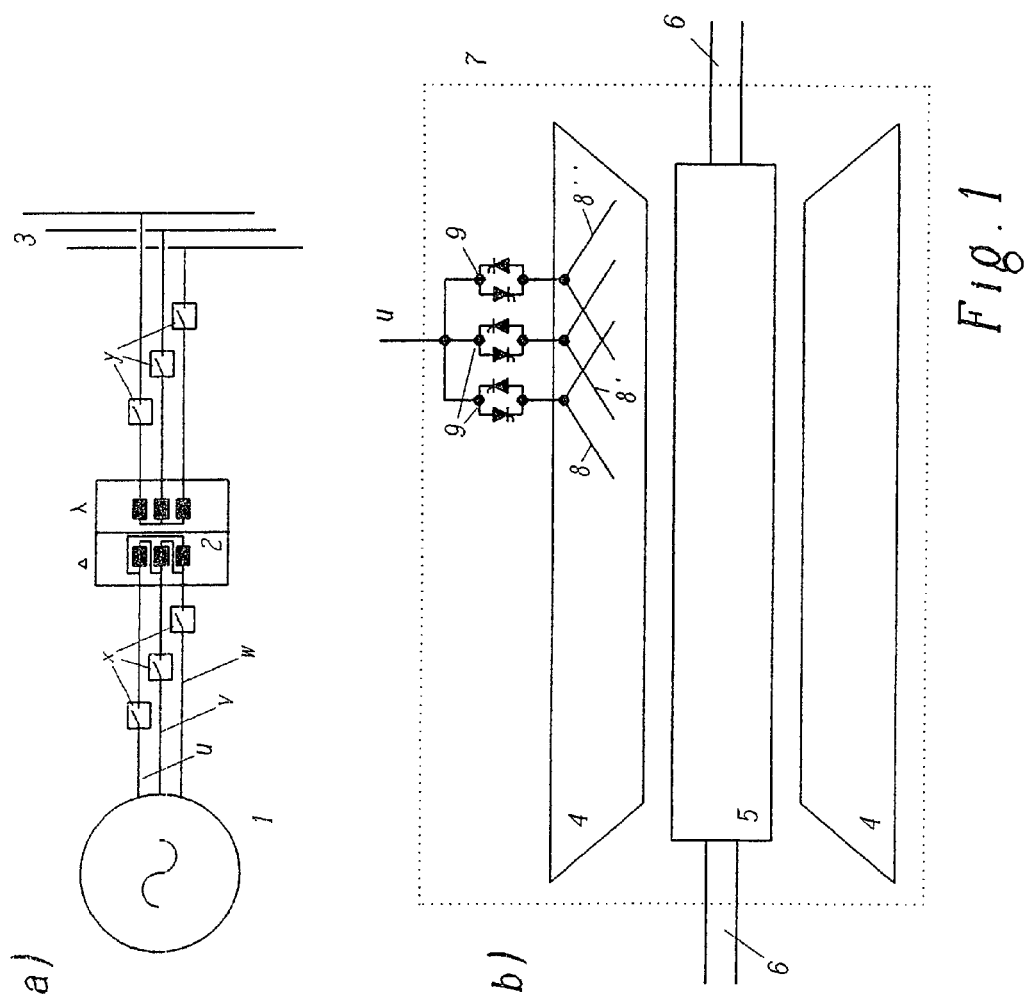
FIG. 1a) shows a schematic depiction of the unit consisting of the generator, transformer, network.
FIG. 1b) shows a schematic section through a generator in which the individual parallel circuits of a phase can be switched.

FIG. 1a) shows a schematic structure of a generator 1 and its coupling via a transformer 2 to a network 3. Here, the three generator phases u, v, w are connected to the three phases of the network 3. When mechanical circuit breakers are used, the approach is typically such that these mechanical circuit breakers are arranged as a generator switch x between the generator 1 and the transformer 2, and/or as a high-voltage switch y between the transformer 2 and the network 3. In all cases, the three generator phases are disconnected from the network during the switching procedure. This distinction will not be further discussed below. However, reference is hereby made to the transformer-free high-voltage generator (ABB Review February 1998, page 21) in which the proposed solution can likewise be utilized in the appropriate manner.

As shown in FIG. 1b), when power electronics are used, the power electronic arrangement can be very simply integrated into the generator 1 or into the housing 7 of the generator 1. In order to keep the currents that occur on the individual circuit breakers 9 within a range that is acceptable for power electronics, the individual parallel circuits 8, 8', 8" of a winding strand of the stator 4 are each connected individually via associated circuit breakers 9. The parallel circuits are combined before the generator terminals to form one phase (in FIG. 1b, for example, to form phase u). In FIG. 1b), a stator with three parallel circuits is shown by way of example, but it is also possible to connect just two parallel circuits or else a plurality of parallel circuits.

If a malfunction then occurs in the network, the voltage on the network typically collapses and an overcurrent occurs on the connection between the generator and the network. The circuit breakers 9 are now interrupted when the above-mentioned quantities reach threshold values. Switching times in the range of 10 ms (thyristors) or even in the range of 1 ms (IGBTs or GTOs) can be reached. Optionally, it is also possible for the switching-on procedure to take place automatically as soon as the voltage on the network once again exceeds the predefined value of the voltage.

Figure 2:
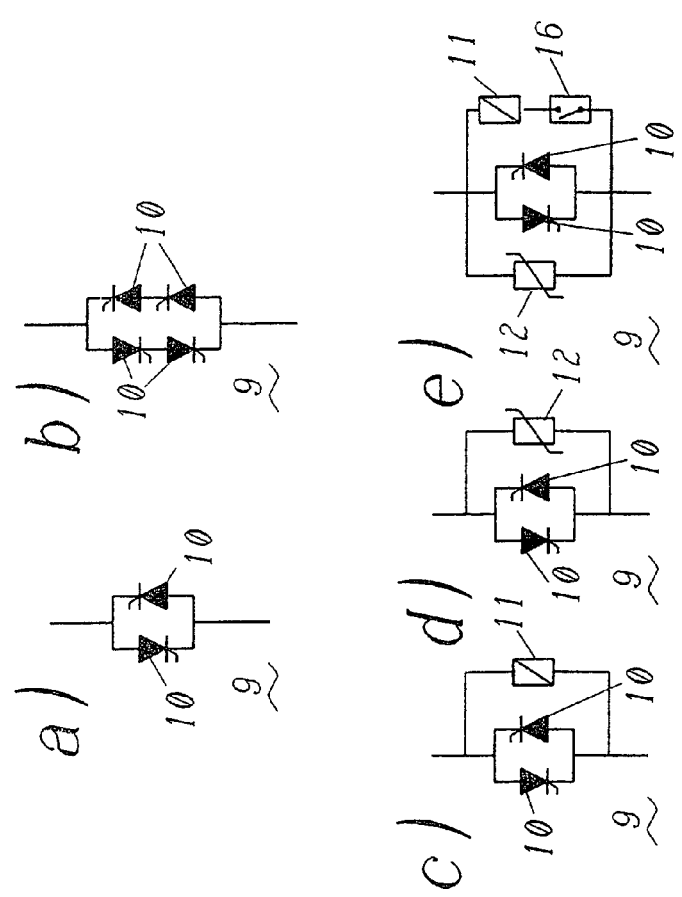
FIG. 2a) shows an electronic circuit breaker utilizing two thyristors.
FIG. 2b) shows an electronic circuit breaker utilizing series-connected thyristors.
FIG. 2c) shows an electronic circuit breaker with a parallel current-limiting impedor.
FIG. 2d) shows an electronic circuit breaker with a parallel non-linear resistor (overvoltage protector)
FIG. 2e) shows an electronic circuit breaker with a parallel current-limiting impedor and overvoltage protector.

The circuit breakers 9 can be realized employing conventional thyristors as is shown in FIG. 2. Different ways of connecting the thyristors 10 can be selected. FIG. 2a) shows the simplest and most robust possibility in which two thyristors are arranged anti-parallel. In order to be able to take up or handle larger voltages, as is shown, for example, in FIG. 2b), two or more thyristors can be provided in series in the appertaining path.

In order to limit the load on the generator shaft 6 during the switching-off procedure, as is shown in FIG. 2c), it is possible to arrange a complex impedor 11 parallel to the thyristors 10 arranged anti-parallel. Thus, a support current can be injected into the network, thus preventing the current from dropping all the way to zero during the switching off. Such a current-limiting impedor can be realized, for example, with an air inductor. However, an auxiliary winding in the generator stator is also conceivable.

Fundamentally, it is possible to configure the circuit breaker in such a way that, at the maximum, it can withstand the loads that occur at the threshold value. Normally, the actual peak values of the voltage or of the current are no longer seen subsequent to the switching procedure of the circuit breakers 9. For safety reasons, however, it has proven to be advantageous to also configure the circuit breaker 9 for the maximum load that can be expected.

Figure 3:
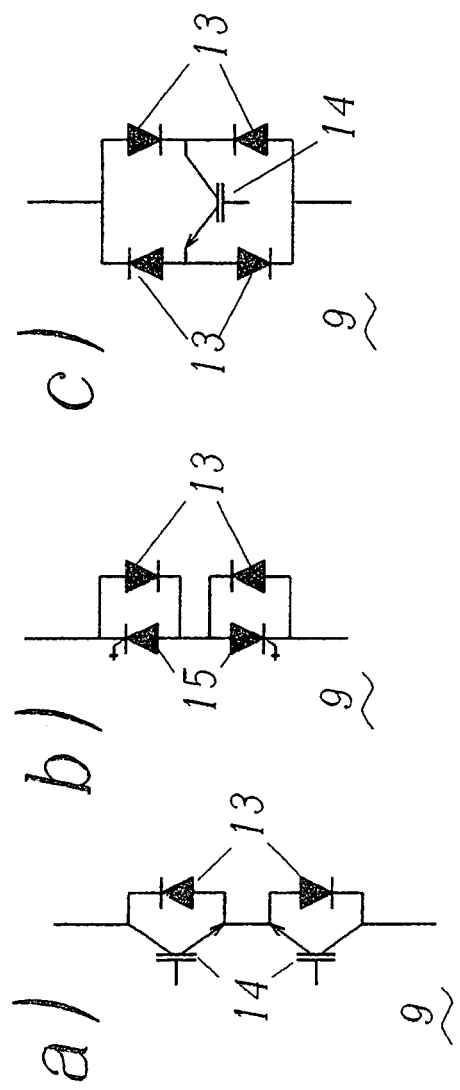
FIG. 3a) shows an electronic circuit breaker utilizing IGBT elements.
FIG. 3b) shows an electronic circuit breaker utilizing GTO elements.
FIG. 3c) shows additional switches utilizing an IGBT element.

If, as shown in FIG. 2, normal thyristors 10 are used, then the switching procedure takes place at the zero crossing of the alternating current. However, if other elements are used as the power electronics (see below under FIG. 3) in which the switching procedure can also take place outside of the zero crossing, then a large amount of inductive energy is released during the switching procedure as a result of the abrupt change in the current. Correspondingly, as shown in FIG. 2d), it can prove to be useful to provide a non-linear resistor as an overvoltage protector 12. For example, ZnO varistors can be used for this purpose which display a non-linear behavior. Above a maximum value of the voltage, in the presence of such an overvoltage protector 12, the current will increase at will (differential resistance→0), whereas below this maximum value, the current flowing through this overvoltage protector 12 is equal to zero (resistance infinite). Thus, in case of an overvoltage, the energy is dissipated as heat in this overvoltage protector.

Of course, as shown in FIG. 2e), it is possible to simultaneously provide a complex impedor 11 and such overvoltage protectors parallel in the same circuit breaker. FIG. 2e) also shows that, in series to the complex impedor 11, another circuit breaker (mechanical or power electronics, the concrete depiction here shows a mechanical circuit breaker 16) can be provided. This is for those cases where the generator has to be completely removed from the network due to a long-term problem with the network.

If IGBTs 14 (insulated gate bipolar transistors) are used instead of the thyristors, then, as is shown in FIG. 3a), they are connected sequentially, whereby the polarity is oriented oppositely. Since these IGBT elements 14 are only capable of withstanding a small amount of negative voltage, diodes 13, each connected anti-parallel thereto, should be provided. Such diodes 13 are typically already integrated into commercially available IGBT elements.

As an alternative, FIG. 3b) shows an embodiment using GTO thyristors 15 (gate turn-off thyristors). Since these elements (GTO thyristors) also have to be protected against negative voltage, preferably diodes 13 that are connected anti-parallel thereto are provided which, in turn, can be integrated into commercially available GTO thyristors. The thyristors 10, the GTO thyristors 15 as well as the IGBTs 14 can make use of technologies on the basis of SiC since these account for excellent behavior in terms of voltage resistance and temperature resistance.

FIG. 3c) shows another possible circuit arrangement utilizing IGBTs 14. Among other things, it is characterized in that inexpensive components can be used which also display good stability and a simple construction.

What is claimed is:

1. A generator having a plurality of phases, the generator comprising:
   a stator including at least one winding strand corresponding to one of the plurality of phases, each winding strand having a plurality of parallel circuits;
   at least one electronic circuit breaker configured to connect and/or disconnect a respective one of the plurality of phases from a network, the at least one circuit breaker integrated into the generator and having a plurality of circuit breaker elements distributed on the plurality of parallel circuits, wherein at least one of the circuit breaker elements includes at least one overvoltage protector element.

2. The generator as recited in claim 1, wherein at least one of the circuit breaker elements includes at least two thyristors connected anti-parallel.

3. The generator as recited in claim 1, wherein at least one of the circuit breaker elements contains thyristors based on SiC technology.

4. The generator as recited in claim 1, wherein at least one of the circuit breaker elements includes at least two oppositely series-connected components, wherein each of the components includes at least one of an IGBT element and a GTO thyristor.

5. The generator as recited in claim 4, wherein each of the two components include a SiC-GTO element and a diode connected anti-parallel to the SiC-GTO element.

6. The generator as recited in claim 1, wherein the at least one overvoltage protector element is in the form of a varistor.

7. The generator as recited in claim 1, wherein at least one of the circuit breaker elements includes at least one of an IGBT element and a GTO thyristor, and a branching having at least two arms, each arm having two diodes arranged anti-parallel in series with a different orientation, and wherein the at least one IGBT element or GTO thyristor are arranged perpendicularly in the branching and connected at each respective arm between the two diodes.

8. The generator as recited in claim 7, wherein the at least one of the IGBT element and the GTO thyristor are in the form of SiC-GTO elements.

9. The generator as recited in claim 1, wherein at least one of the circuit breaker elements has circuitry for power take-up in case of a switching off procedure.

10. The generator as recited in claim 9, wherein the circuitry includes at least one non-linear resistor arranged parallel to the circuit breaker element as an overvoltage protector.

11. The generator as recited in claim 1, wherein the parallel circuits are connected to one of the plurality of phases, wherein the parallel circuits can be switched off simultaneously or sequentially using the circuit breaker elements.

12. The generator as recited in claim 1, wherein the generator has a power of more than 5 MW.

13. The generator as recited in claim 12, wherein the power is above 50 MW.

14. The generator as recited in claim 13, wherein the power is above 50 MW and up to 2000 MW.

15. A method for operating the generator as recited in claim 1, wherein the circuit breaker elements open the circuit simultaneously or in a regulated short sequence as a result of a predetermined condition being met, wherein the predetermined condition includes at least one of a network current exceeding a threshold current value and a network voltage falling short of a threshold voltage value.

16. The method as recited in claim 15, further comprising closing the circuit breaker elements again automatically after the opening step as a result of the predetermined condition being no longer met.

17. The method as recited in claim 16, wherein the closing step is performed after a predefined delay following the time when that the predetermined condition is no longer met.

18. A generator having a plurality of phases, the generator comprising:
   a stator including at least one winding strand corresponding to one of the plurality of phases, each winding strand having a plurality of parallel circuits;
   at least one electronic circuit breaker configured to connect and/or disconnect a respective one of the plurality of phases from a network, the at least one circuit breaker integrated into the generator and having a plurality of circuit breaker elements distributed on the plurality of parallel circuits, wherein at least one of the circuit breaker elements includes at least one current-limiting impedor.

* * * * *